Oct. 31, 1950  H. GANG  2,527,990
CARRIAGE SHIFTING MECHANISM
Filed July 7, 1948
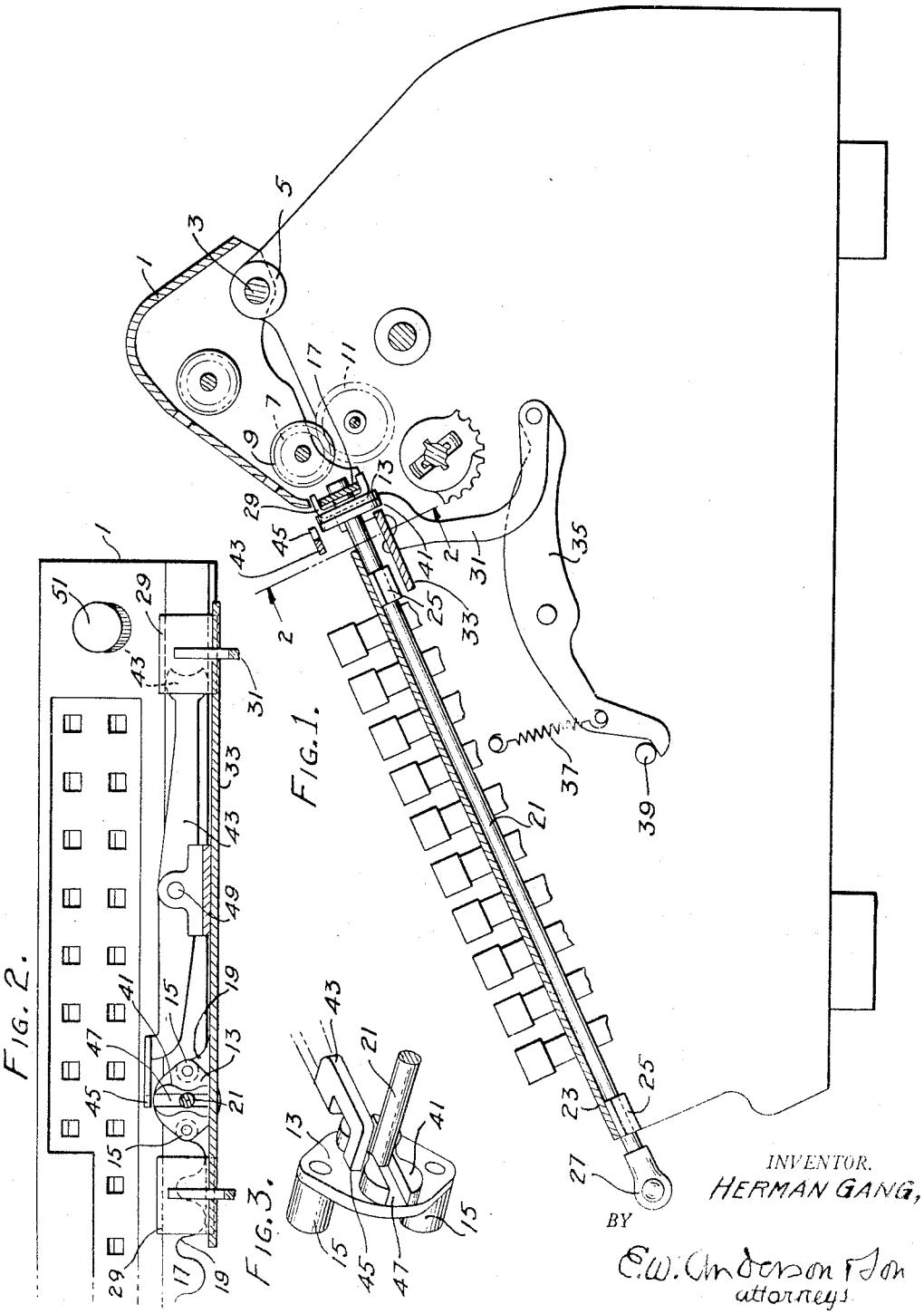
INVENTOR.
HERMAN GANG,
BY
E.W. Anderson & Son
attorneys

Patented Oct. 31, 1950

2,527,990

UNITED STATES PATENT OFFICE 2,527,990

CARRIAGE SHIFTING MECHANISM

Herman Gang, Livingston, N. J., assignor to Monroe Calculating Machine Company, Orange, N. J., a corporation of Delaware Application July 7, 1948, Serial No. 37,363

7 Claims. (Cl. 235—63)

The invention relates to carriage shifting devices for calculating machines and particularly to such devices which are constructed and operate substantially as disclosed in the Baldwin Reissue Patent #13,842, dated December 8, 1914.

As will appear in the following description, carriage shifting devices as disclosed in the above named patent are subject to misoperation, which may result in unintentional shifting of the carriage without pause through a one or more denominational orders in addition to the intended one order shift, and it is an object of the invention to provide means for preventing such unintentional shifting of the carriage. Other objects and advantages will appear hereinafter or will be obvious.

Fig. 1 is a vertical section through the calculating machine and the shiftable carriage thereof showing a portion of the carriage shifting mechanism.

Fig. 2 is a detail fragmentary front view of the shiftable carriage taken on line 2—2 of Fig. 1 and showing the shift mechanism associated therewith.

Fig. 3 is a detail fragmentary perspective view further illustrating the invention and showing the parts in an operated position.

The carriage 1 is provided at its rear (Fig. 1) with a shaft 3 extending between the end plates thereof. Shaft 3 is slidably and rotatably mounted in suitable bearings 5 in the side frames of the machine. The carriage is thus adapted to be raised at its forward end to disengage the gears 7 of the product-dividend wheels 9 from transmission gears 11 so that the carriage may be longitudinally shifted through the successive orders.

Means whereby carriage 1 is shifted includes a diametric double crank arm 13 constituting a head (Figs. 2 and 3) provided at its ends with rollers 15. Affixed to the lower front and extending the length of carriage 1 is a rail 17 provided with a series of equally spaced notches 19. When the parts are in normal position (Fig. 2), crank arm 13 is horizontally disposed with the pair of rollers 15 in engagement with a respective pair of notches 19. As shown in Fig. 2, carriage 1 is in its leftmost shifted position with a pair of rollers 15 in engagement with the two rightmost notches of rail 17. In the shifting operation, crank arm 13 is adapted to be rotated in either direction by a shaft 21 on the rearward end of which it is centrally mounted, said shaft extending toward the front of the machine beneath keyboard 23 where it is rotatably mounted in suitable bearings 25. At its forward end, shaft 21 is provided with an operating handle 27 (Fig. 1) whereby said shaft 21 may be rotated a half turn clockwise (Fig. 2) to effect a right shift of one order and counterclockwise to effect a left shift.

When crank arm 13 is rotated clockwise (Fig. 2), for example, the leftmost roller 15 in engagement with a notch 19 will, through the first 90° of travel, raise the carriage pivotally and at the same time move it toward the right. During this movement, the rightmost roller 15 of crank arm 13 will be moved downwardly from engagement with its notch in rail 17 as the forward edge of the carriage is moved upwardly. When crank arm 13 has passed the 90° point, no further application of power to shaft 21 is necessary to complete the shift, as the weight of the carriage assisted by a pair of locators, to be described, will urge said crank arm further in clockwise direction to complete the half turn as the carriage moves downwardly and to the right into shifted position.

There are two identical carriage locators positioned adjacent to and inwardly of the right and left side frames of the casing of the machine, each locator (Figs. 1 and 2) comprising a lever 35, fulcrumed to the adjacent side frame, a spring 37 connected to one arm of said lever and at its other end to a stud of said side frame urging the other arm of said lever downwardly and the first named arm upwardly against a stop 39 of said side frame, said other arm having an extension arm 31 pivoted thereto and extending upwardly at the rear of the keyboard through a slot of guide plate 33 and being provided at its upper end with a U-shaped jaw or member 29 embracing the carriage rail 17 and through which said rail is longitudinally slidable in the shifting of the carriage. These locators thus act to pull or urge the carriage downwardly in its fall by gravity to complete the shift.

The foregoing description of the carriage shift operation is substantially as disclosed in said reissued Patent #13,842, in which the shift is effected by manual operation. It will be obvious, however, that the carriage shift devices may be power operated and automatically controlled; for example, as fully disclosed in the Chase Patent #1,829,210, dated October 27, 1931.

The unintended shifting of the carriage without pause through one or more denominational orders in addition to the intended one order shift which is prevented by the invention to be hereinafter described occurs when shaft 21 is given a rotary impulse considerably in excess of that required to effect the one order shift. In such instance, the active roller of crank arm 13 in its downward movement after having passed the 90° point will, because of excess speed, move out of full engagement with its notch in rail 17. This is because the downward movement of the carriage due to gravity and the action of the carriage locators is not rapid enough to follow the downward movement of the roller. When this occurs, the downward movement of the carriage is accompanied by a longitudinal movement thereof in the direction of the shift. The active roller of crank arm 13, being at this time no longer in full engagement with its notch 19 of rail 17, will be ineffective to restrain the longitudinal movement of the carriage. The carriage will, therefore, be carried too far in the shifted direction due to its momentum, and, depending upon the excess of the shift impulse will be shifted one or more orders additional to the intended one order shift. However, crank arm 13 will have been rotated only the intended half turn, as the inactive roller 15 of said crank arm will have been brought upward into contact with an edge of a notch 19 of rail 17, thus preventing the crank arm from further movement, and the roller will exert a camming action on the curved edge of said notch as the carriage is allowed to escape beyond the intended shift position.

Means is provided to positively maintain the active roller 15 of crank arm 13 in full engagement with the proper notch 19 of rail 17 during the shift operation. The carriage is thus prevented from escaping past the intended shift position. Such means comprises a diametric double boss device 41 (Figs. 2 and 3) integral with crank arm 13, and a lever 43 provided with a blocking finger 45 adapted for engagement with said boss.

The boss is defined by an identical pair of cylindrically contoured heads located an equal distance from the center of crank arm 13 and at right angles to said crank arm. These heads are connected by a narrowed neck portion and a slot 47 extends centrally and longitudinally of the boss device from each end to shaft 21 at the center of the crank arm.

Lever 43 (Fig. 2) is fulcrumed at 49 on a bracket mounted on fixed guide plate 33. The rightmost end 43' of one arm of lever 43 is retained by the right hand carriage locator jaw 29, which jaw embraces carriage rail 17. When the parts are in normal position (Fig. 2), the blocking finger 45 at the leftmost end of the other arm of lever 43 is positioned just above slot 47 in boss 41.

When crank arm 13 is rotated in either direction to effect a carriage shift, boss 41 integral therewith is likewise rotated, thus moving slot 47 from beneath finger 45. At the same time, as carriage 1 is being raised and moved in the shift direction, lever 43 is rocked counterclockwise (Fig. 2) by jaw 29, thus moving finger 45 downwardly to follow the contour of the boss. It will thus be seen that the carriage is prevented from being thrown upwardly by an excessive shift impulse to disengage the notch 19 in registration with the active roller of crank arm 13.

From an inspection of Fig. 3, it will be seen that after the active roller 15 has passed the 90° point in the shift, it is prevented from moving downwardly and from engagement with its notch in rail 17. Should a tendency toward such action take place, as heretofore described, boss 41 would be urged against finger 45, which would accordingly limit the rate of movement of crank arm 13 to the upward movement of said finger, which is controlled by the downward movement of the carriage into shifted position.

In order that the carriage may be intentionally shifted without pause through a plurality of denominational orders, as is requisite in certain cases, it is raised to clear the notches 19 from the rollers 15 of the crank arm, shifted longitudinally to the desired order and dropped to the shifted position, this being permitted by the slot 47 of the boss device within which slot the finger 45 of the lever 43 passes as the carriage is raised, and from which slot said finger escapes when the carriage is dropped to the shifted position to reengage the notches of the rail 17 with the rollers 15 of the crank arm. A handle knob 51 (Fig. 2) is provided for the purpose of directly raising the carriage in this case.

I claim:

1. In a calculating machine, a stationary casing having a series of transmission gears, and a denominationally shiftable carriage pivoted to said casing having a series of product-dividend gears meshing with said transmission gears, said carriage having a rail provided with a longitudinal series of notches and said casing having a rotary shaft provided with a head and diametrically disposed spaced rollers on said head engaging two adjacent of said notches to raise the carriage pivotally to disengage said gears, shift the carriage and reengage said gears, the stationary casing having spring-urged means engaging the rail of the carriage to urge the carriage downwardly in its fall by gravity as it is shifted comprising a U-shaped member embracing said rail; in combination with positive follower means for retaining the full roller and notch engagement throughout said shifting, comprising a diametric double boss device on said head and a lever device fulcrumed to said casing and at one end having a finger overlying and following the movement of said boss device and at its other end having sliding engagement with and following the movement of said U-shaped member in the pivotal shifting movement of the carriage.

2. In a calculating machine, a stationary casing having a series of transmission gears, and a denominationally shiftable carriage pivoted to said casing having a series of product-dividend gears meshing with said transmission gears, said carriage having a rail provided with a longitudinal series of notches and said casing having a rotary shaft provided with a head and diametrically disposed spaced rollers on said head engaging two adjacent of said notches to raise the carriage pivotally to disengage said gears, shift the carriage and reengage said gears, said stationary casing having spring-urged means engaging the rail of the carriage to urge the carriage downwardly in its fall by gravity as it is shifted comprising a U-shaped member embracing said rail; in combination with positive follower means for retaining the full roller and notch engagement throughout said shifting comprising a diametric double boss device on said head and a lever device fulcrumed to said casing and at one end having a finger overlying and following the movement of said boss device and at its other end having sliding engagement with and following the movement of said U-shaped member in the pivotal shifting movement of the carriage, said boss device having a longitudinal slot through which said finger is adapted to pass to permit in the normal positions of the parts raising of the carriage to clear the notches from the rollers when the carriage is to be manually shifted without pause through a plurality of denominational orders without operation of said shaft.

3. In a calculating machine, a stationary casing having a series of transmission gears, and a denominationally shiftable carriage pivoted to said casing having a series of product-dividend gears meshing with said transmission gears, said carriage having a rail provided with a longitudinal series of notches and a rotary shaft journalled in said casing and provided with a diametric double crank arm having end members engaging said notches for raising the carriage pivotally, disengaging said gears, shifting the carriage and reengaging said gears upon rotation of said shaft; in combination with means for positively retaining full end member and notch engagement throughout said carriage shifting comprising a lever fulcrumed to said casing, connections responsive to movement of said carriage for operating said lever synchronously with the pivotal movement of the carriage and means for confining the lever and thereby said carriage to a path of operation prescribed by said full member and notch engagement.

4. In a calculating machine, a stationary casing having a series of transmission gears, and a denominationally shiftable carriage pivoted to said casing having a series of product-dividend gears meshing with said transmission gears, said carriage having a rail provided with a longitudinal series of notches and a rotary shaft journalled on said casing and provided with a diametric double crank arm having end members engaging said notches for raising the carriage pivotally, disengaging said gears, shifting the carriage and reengaging said gears upon rotation of said shaft; in combination with means for positively retaining full member and notch engagement throughout said carriage shifting comprising a lever fulcrumed to said casing, a means mounted on said casing with which said carriage rail has sliding engagement for operating said lever synchronously with the pivotal shifting movement of the carriage and a means on said shaft and engaging said lever for confining said lever to a path of operation prescribed by said full member and notch engagement.

5. In a calculating machine, a stationary casing having a series of transmission gears, a denominationally shiftable carriage pivoted to said casing having a series of product-dividend gears meshing with said transmission gears, said carriage having a rail provided with a longitudinal series of notches, a rotary shaft journalled in said casing and provided with a diametric double crank arm having end members engaging said notches for raising the carriage pivotally, disengaging said gears, shifting the carriage and reengaging said gears upon rotation of said shaft, and spring-urged means mounted on said casing with which said carriage rail has sliding engagement to urge the carriage downwardly during its shifting; in combination with means for positively retaining the full member and notch engagement throughout the carriage shifting comprising a lever fulcrumed to said casing, one arm of said lever having engagement with said spring-urged means to operate the lever synchronously with the pivotal shifting movement of the carriage, and means on said shaft with which the other arm of said lever has engagement to confine the lever to a path of operation prescribed by said full member and notch engagement.

6. In a calculating machine, a stationary casing having a series of transmission gears, a denominationally shiftable carriage pivoted to said casing having a series of product-dividend gears meshing with said transmission gears, said carriage having a rail provided with a longitudinal series of notches, a rotary shaft journaled in said casing and provided with a diametric double crank arm, said arm having end members engaging said notches for raising the carriage pivotally, disengaging said gears, shifting the carriage and reengaging said gears upon rotation of said shaft, and spring-urged means mounted on said casing with which said carriage rail has sliding engagement to urge the carriage downwardly during its shifting; in combination with means for positively retaining the full member and notch engagement throughout the carriage shifting comprising a lever fulcrumed to said casing, one arm of which has engagement with said spring-urged means for operating said lever synchronously with the pivotal shifting movement of the carriage and two cylindrically contoured cam bosses having a neck connection on said shaft, located at right angles to said double crank arm which the other arm of said lever engages for confining the movement of said lever to a path of operation prescribed by said full member and notch engagement.

7. In a calculating machine, a stationary casing having a series of transmission gears, a denominationally shiftable carriage pivoted to said casing having a series of product-dividend gears meshing with said transmission gears, said carriage having a rail provided with a longitudinal series of notches, a rotary shaft provided with a diametric double crank arm having end rollers engaging said notches for raising the carriage pivotally, disengaging said gears, shifting the carriage and reengaging said gears upon rotation of said shaft, and spring urged means mounted on said casing with which said carriage rail has sliding engagement to urge the carriage downwardly during its shifting; in combination with means for positively retaining the full roller and notch engagement throughout the carriage shifting comprising a lever fulcrumed to said casing and having one arm in engagement with said spring-urged means to operate said lever synchronously with the pivotal shifting movement of the carriage, and two cylindrically contoured cam bosses on said shaft and located at right angles to said double crank arm and engaging the other arm of said lever for confining movement of said lever to a path of operation prescribed by said full roller and notch engagement, said bosses having a longitudinal open-end slot, into which said latter arm of said lever may pass to permit direct manual shifting of the carriage without pause through a plurality of denominational orders.

HERMAN GANG.

REFERENCES CITED

The following references are of record in the file of this patent:

UNITED STATES PATENTS

| Number | Name | Date |
| --- | --- | --- |
| Re. 13,842 | Baldwin | Dec. 8, 1941 |
| 1,539,151 | Wolf | May 26, 1925 |
| 1,811,607 | Britten, Jr. | June 23, 1931 |
| 1,858,295 | Enders | May 17, 1932 |
| 1,957,496 | Friden | May 8, 1934 |
| 2,304,231 | Avery et al. | Dec. 8, 1942 |
| 2,310,280 | Friden | Feb. 9, 1943 |